United States Patent [19]

Pfister

[11] 3,841,416
[45] Oct. 15, 1974

[54] PORTABLE JIG-SAW AND SPINDLE SANDER

[75] Inventor: Herbert R. Pfister, Stony Brook, N.Y.

[73] Assignee: The Black and Decker Manufacturing Company, Towson, Md.

[22] Filed: Aug. 15, 1972

[21] Appl. No.: 280,745

[52] U.S. Cl............ 173/31, 51/170 PT, 74/22 A, 144/35 A, 173/47, 173/170, 408/20
[51] Int. Cl............................................ B27b 11/00
[58] Field of Search ................ 173/47, 48, 109, 31; 74/22 R, 22 A, 23, 50, 49, 57, 411.5; 408/20; 51/170 PT, 34 R; 144/35 R, 35 A

[56] References Cited
UNITED STATES PATENTS

| 2,417,170 | 3/1947 | Langfelder | 74/22 X |
| 2,531,849 | 2/1949 | Karleen | 51/170 PT |
| 2,858,701 | 11/1958 | Willcox | 74/22 |
| 2,866,485 | 12/1958 | Anton | 74/50 X |
| 2,933,800 | 4/1960 | Friden | 74/22 X |
| 3,170,496 | 2/1965 | Kohler et al. | 74/50 X |

Primary Examiner—Ernest R. Purser

[57] ABSTRACT

In a portable electric power tool of the type having a housing including a handle, an electric motor, and an output shaft, selectively operable means movable to one position for connecting the motor with the shaft for reciprocating the latter at a selected rate for jig-saw operation and movable to a second position for connecting the motor with the shaft for rotating the latter and simultaneously reciprocating the shaft at a rate less than the selected rate for spindle-sander operation, the selectively operable means being movable to a third non-driving position wherein the output shaft may be manually rotated and thus angularly positioned for subsequent use as, for example, in sawing.

3 Claims, 12 Drawing Figures

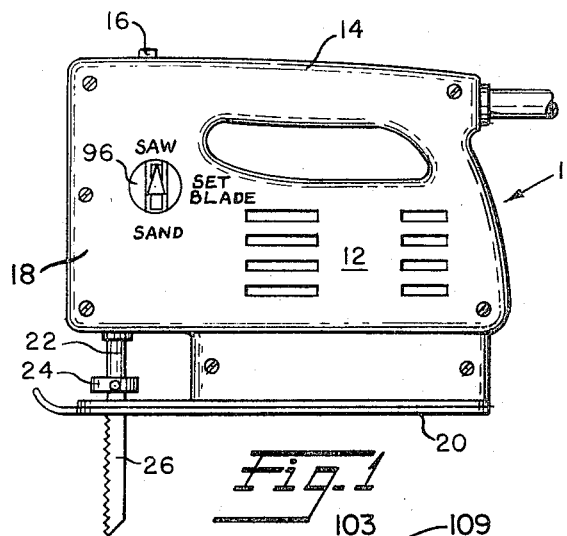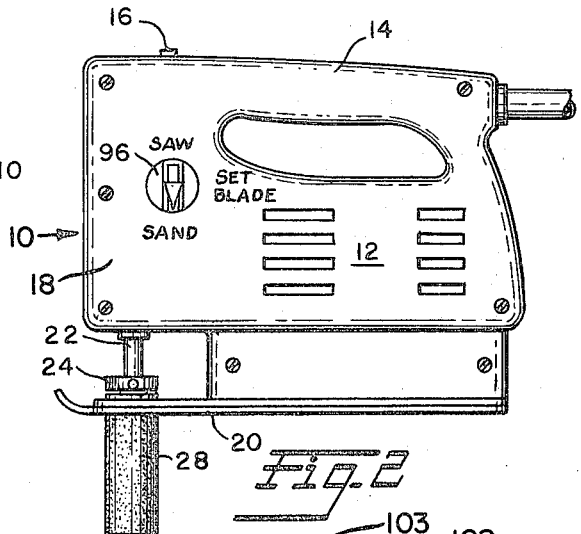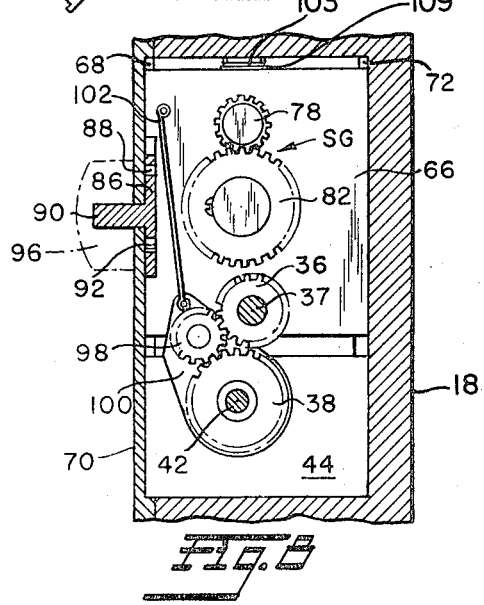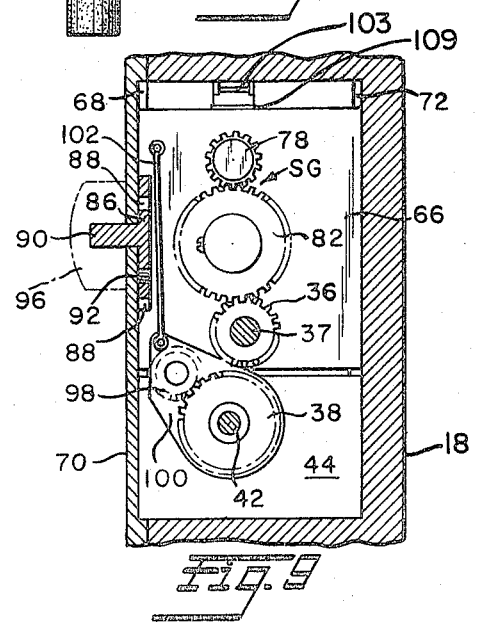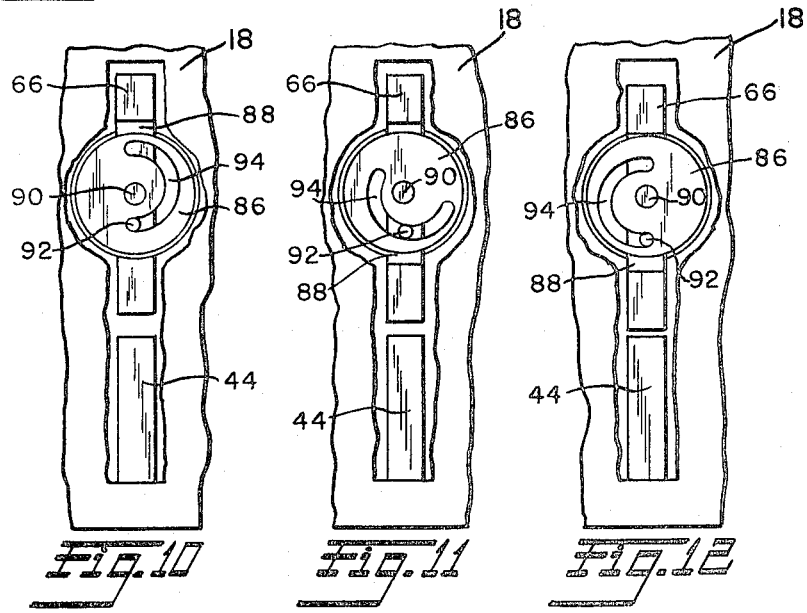

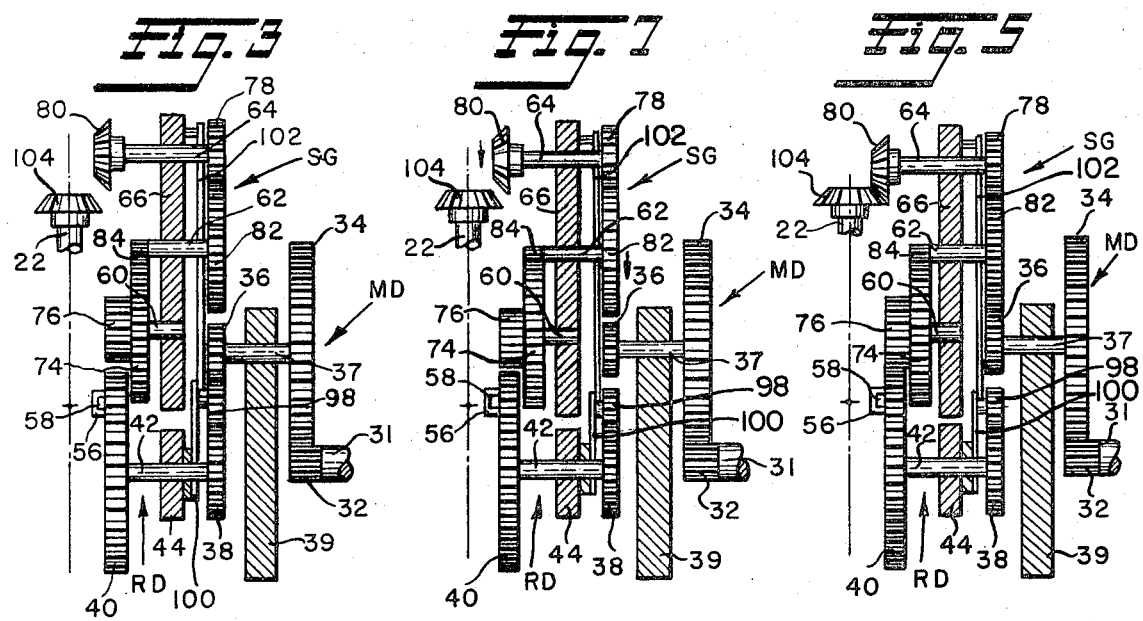
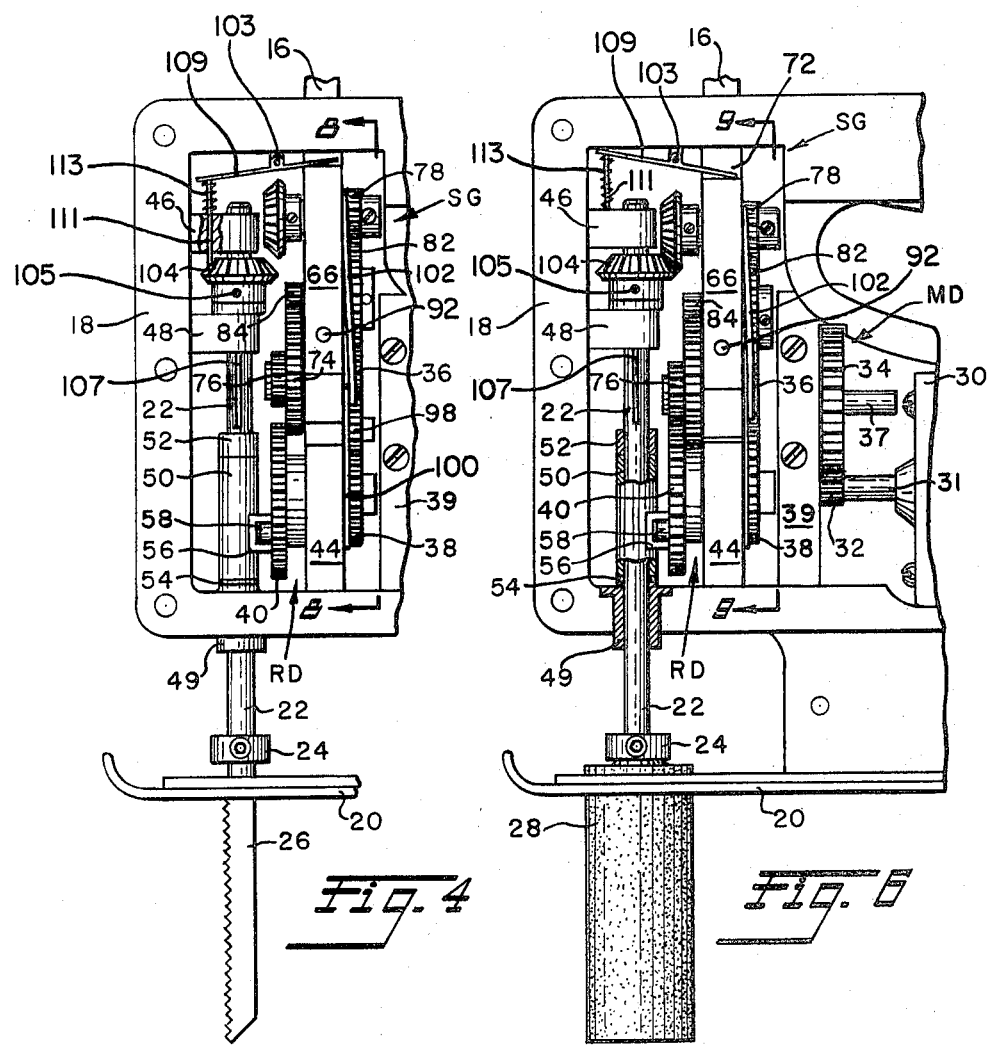

PORTABLE JIG-SAW AND SPINDLE SANDER

DESCRIPTION OF THE INVENTION

Portable electric power tools heretofore provided have been designed in a variety of forms, including the common portable power drill and a number of similar devices such as tools adaptable for rotary carving, grinding or sanding. It has also been proposed to provide adaptors for converting the normal rotary motion of the output shaft to a reciprocating motion for use in sawing or filing, for example in an effort to secure either a reciprocating motion of the output shaft or a rotary motion thereof. Most of these proposals, however, have required the use of external transmission devices to permit the conversion of rotary to reciprocating motion and vice versa thus resulting in a rather bulky and expensive portable tool. In certain instances, the prior portable tools have included a construction for combining the reciprocating and rotary motions in an attempt to provide a composite movement of the output shaft of the tool. In such prior tools which have included the composite movements, the relatively high speed of the reciprocating motion of the output shaft has been found to be undesirable, especially when the tool is to be used as a drum sander, for example. This is so since a drum sander may be difficult, if not impossible, to control for finishing sanding at relatively high reciprocating speeds.

It is accordingly an object of the present invention to provide a novel, portable electric power tool which is so constructed as to avoid the above difficulties.

Another object is to provide a portable power tool which is arranged in such a manner that the output shaft may be reciprocated at a preselected relatively high speed suitable for jig-sawing and wherein the said shaft may be rotated and simultaneously reciprocated at a relatively low speed which operation is highly efficient when used for the sanding of a workpiece.

Still another object is to provide in a combination power tool of the above type, a novel motion transmission mechanism housed wholly within the tool for imparting reciprocating movement to the output shaft or for securing combined rotary and reciprocating movement thereof, together with a relatively simple manually operable device for selecting one or the other of said movements.

Still another object is to provide a portable, power operated tool capable of convenient and easy use in providing finished edges on a variety of workpieces.

A further object is to provide a novel combination tool of the foregoing character which will be light in weight, capable of being manufactured at a relatively low cost but which will be highly reliable in operation.

The above and other objects and desirable features of the invention will appear more fully hereinafter from a consideration of the following detailed description when taken in connection with the accompanying drawings illustrative of a preferred form of the invention. It will be expressly understood however, that the drawings are utilized for purposes of illustration only and are not to be taken as a definition of the limits of the invention, reference for this latter purpose being had to the appended claims.

In the drawings, wherein similar reference characters refer to similar parts throughout the several views:

FIG. 1 is a side view of a portable electric power tool embodying the principles of the present invention and illustrating the use of the tool as a power jig-saw;

FIG. 2 is a view similar to FIG. 1 but illustrating its use as a combined rotary and reciprocating drum sander;

FIG. 3 is a diagrammatic view of the position of the gear train transmission when the portable tool is used as a jig-saw;

FIG. 4 is a fragmentary side view of the tool with the cover removed and illustrating the adjustment of the gear train transmission for jig-saw operation;

FIG. 5 is a view similar to FIG. 3 but illustrating the position of the gear train transmission when the tool is used as a combined rotary and reciprocating drum sander;

FIG. 6 is a view similar to FIG. 4 but showing the parts adjusted to the drum sander operating position;

FIG. 7 is a view similar to FIGS. 3 and 5 but illustrating the gear train in a neutral non-driving or set blade position;

FIG. 8 is a partial sectional view of the tool taken substantially along line 8—8 of FIG. 4;

FIG. 9 is a partial sectional view of the tool taken substantially along line 9—9 of FIG. 6, and FIGS. 10, 11 and 12 are diagrammatic views illustrating the various positions of the manually operable selector means for moving the gear train transmission respectively to the positions for jig-sawing, blade setting, and sanding.

The novel portable combination jig-saw and sander 10 of the present invention is illustrated in FIGS. 1 and 2 as comprising a motor housing 12, comprising an upper handle member 14 including a conventional switch 16, a gear case 18 and a shoe 20 for guiding the tool on a suitable workpiece. An output shaft 22 is suitably mounted in the gear case 18 and is provided with a conventional collar 24 for receiving a jig-saw blade 26 or a drum sander 28 depending upon the desired use of the tool.

Referring more particularly to FIG. 6, an electric motor 30 is suitably mounted within the motor housing 12 and is provided with an output shaft 31 to which a motor drive gear train MD is connected, such gear train including a pinion 32 arranged to drive gears 34 and 36, the latter being secured to a shaft 37 which is rotatably mounted in a housing part 39, see also FIGS. 3, 5 and 7. Thus it is seen that from this construction, the gear 36 of the motor drive MD will be rotated whenever the motor 30 is energized.

In order to effect reciprocating movement of the output shaft 22, the latter is connected to be driven by a reciprocating drive gear train RD which, in accordance with FIGS. 3 and 4 includes a pair of gears 38 and 40 which are secured to a shaft 42 rotatably mounted in a housing part 44. As will appear from FIG. 6, the output shaft 22 is freely mounted for reciprocatory movement in the gear casing 18 by means of housing bracket supports 46, 48 and bearing 49, and a drive sleeve 50 freely surrounds the shaft and is confined between collars 52 and 54 fixed thereto. The sleeve 50 is drivably connected with the gear 40 through a conventional "Scotch-yoke" device comprising a horizontally disposed channel member 56 secured to the sleeve 50 and an eccentric drive pin 58 carried by the gear 40. With such an arrangement it will be understood that upon operation of the reciprocating drive gear train RD, the "Scotch-yoke" device will effect reciprocation of the output shaft 22, and thus jig-saw operation of the portable tool.

An important feature of the invention resides in the provision of means for connecting the motor drive MD with the reciprocating drive RD for effecting the aforesaid reciprocation of the output shaft 22 as well for connecting the motor drive MD with the output shaft 22 for simultaneously rotating and reciprocating the latter so that the portable tool may be employed as a combined rotary and reciprocating drum sander. As shown in FIGS. 3–7 and 9, such means comprises a shiftable gear train SG which includes shafts 60, 62 and 64 which are rotatably mounted in a shiftable carrier 66, the latter being slidably supported at one edge in a slot 68 formed in the gear case cover 70 and at the other edge in a slot 72 formed in the gear case 18. Shaft 60 has affixed thereto gears 74 and 76 while shaft 64 has a gear 78 secured at one end thereof and a bevel gear 80 secured at its opposite end. The intermediate shaft 62 has gears 82 and 84 secured to its opposite ends, such gears being so positioned that gears 78 and 82 are in constant mesh as are gears 84 and 74. With the foregoing arrangement, it will be readily understood that the shiftable gear train SG comprises an input gear 82 and a pair of output gears 76 and 80, the latter functioning to impart a combined reciprocating and rotatable motion to the output shaft 22 in a manner which will appear more fully hereinafter.

In order to move the shiftable gear train SG into and out of operative driving relationship with respect to the motor drive MD and the reciprocating drive RD, the invention provides a novel manually operable control means for shifting the carrier 66 upwardly or downwardly to respectively condition the tool for jig-saw or spindle-sander operation. Referring more particularly to FIGS. 8–12, such means includes a rotatable cam member 86 seated in a recess 88 formed in an edge of the carrier 66, said cam member being provided with a stub shaft 90 projecting through an opening in the cover 70. A pin 92 fixed to the carrier 66 projects through a cam slot 94 formed in the member 86 and from this construction, it will be readily seen from FIGS. 10–12 that when a control knob 96, affixed to the shaft 90 is rotated, the carrier 66 may be shifted upwardly or downwardly depending upon the direction of rotation of the knob.

In addition to the foregoing, the invention provides a novel control function for selectively connecting the motor drive MD with the reciprocating drive RD during shifting of the carrier 66 and the shiftable gear train SG. Referring to FIGS. 3, 8 and 9, a control gear 98 is rotatably mounted on a bracket 100 which is pivotally mounted on the shaft 42. The bracket 100 is connected with the shiftable carrier 66 by a suitable link 102 so that the bracket and control gear 98 may be moved to and from the positions illustrated in FIGS. 8 and 9 when the carrier 66 is shifted as above described. As shown, the control gear 98 is in constant meshing engagement with the gear 38. Thus, when the carrier 66 is shifted to the position shown in FIGS. 3 and 8, the gear 98 will also engage the gear 36 in order to establish a driving connection between the motor drive MD and the reciprocating drive RD to condition the tool for relatively high speed jig-saw operation due to the ratios of the gearing. On the other hand, when the carrier 66 is moved in the opposite direction as shown in FIGS. 6 and 9, the gear 98 will be disengaged from the gear 36 thus interrupting the drive between the motor drive MD and the reciprocating drive RD. When this occurs, the gear 76 will engage gear 40 while the gear 82 will be moved into engagement with the gear 38, thus establishing a driving connection between the motor drive MD and the reciprocating drive RD through the speed reducing gears 82, 84, 74 and 76 of the shiftable gearing SG in order to effect reciprocating of the output shaft 22 at a relatively low speed.

It will be noted from FIGS. 5, 6 and 9 that when the foregoing driving connection is made, the bevel gear 80 is moved into engagement with a bevel gear 104. The latter carries a pin 105 which slides in a slot 107 formed in the output shaft 22 so that the shaft may be rotated by the intermeshed bevel gears 80 and 104 while allowing reciprocation thereof. Thus, when the tool is conditioned in this manner, the shaft 22 will be simultaneously rotated and reciprocated, the speed of reciprocation however, being materially less than that produced through gears 35, 98 and 38.

In operation, FIGS. 1, 3, 4, 8 and 10 illustrate the position of the various parts when the power tool is adjusted for jig-saw operation. To secure such adjustment, the control knob 96 is moved to the "Saw" position and shifts the carrier 66 and the shiftable gearing SG mounted thereon to the position shown, so that the control gear 98 interconnects the gears 36 and 38. When so positioned, carrier 66 pivots a lever 109, mounted on the gear case 18 by a pivot pin 103, in a counterclockwise direction, as shown in FIG. 4, and moves a locking pin 111, slidable in the support 48, downwardly against the force of a compression spring 113 and into locking engagement with the teeth of gear 104 thereby preventing the latter, and shaft 22, from turning. It will be appreciated that the shaft 22, and blade 26, can be locked in as many angular positions as there are teeth on gear 104 so that a large number of blade settings (angles of attack) can be achieved. Thus, before the knob 96 is moved to the "Saw" position, the shaft 22 is rotated to the desired setting with the control knob 96 in the "Set Blade" position. Here the parts are positioned as shown in FIGS. 7 and 11 with the locking pin 111 out of engagement with gear 104, and gears 80, 104 disengaged. Thereafter, with the blade properly set, the knob 96 is moved to the "Saw" position. Suitable detent means, or the equivalent, may be employed to retain the parts in the "Saw," "Set Blade," and/or "Sand" position to be described.

The motor drive MD is thereby connected with the reciprocating drive RD in order to reciprocate the output shaft 22 at a relatively high rate suitable for jig-saw operation. Following the sawing of the workpiece, should it be desired to sand the edges thereof, it is only necessary to substitute the drum sander 28 for the saw blade 26 and move the control knob to the "Sand" position, FIG. 2. Such movement shifts the carrier 66, shiftable gearing SG and control gear 98 to the positions illustrated in FIGS. 5, 6, 9 and 12 where the gear 98 is disconnected from the gear 36 of the motor drive MD and the latter gear is connected with gear 82 of the shiftable gear train SG. Simultaneously therewith, the bevel gears 80 and 104 are moved into engagement while the output gear 76 of the gear train SG is engaged with the gear 40 of the reciprocating drive RD. The lever 109 pivots in a clockwise direction, as seen in FIG. 6, and the locking pin 111 moves upwardly under the force of spring 113, so that upon energization of the motor 30, the output shaft 22 will thereupon be simultaneously rotated and reciprocated for the sanding operation. However, due to the speed reduction gearing constituting the shiftable gear train SG, the speed of reciprocation of the shaft 22 will be materially less than that during the sawing operation. The speed of rotation of the shaft however, will be significantly greater than the reciprocating speed in order to secure efficient sanding of the workpiece.

The neutral or "Set Blade" position of the shiftable gear transmission 56 is shown in FIGS. 7 and 11 and therefrom it will be appreciated that the motor drive MD is disconnected from the reciprocating drive RD as well as the shiftable drive SD. Under these conditions, as described above, the output shaft may be manually rotated to any desired angular position for subsequent use in sawing, for example.

From the foregoing, it will be readily seen that the invention provides a novel portable power tool which is especially useful for sawing and sanding operations on a workpiece. The tool is particularly adapted for finishing contoured edges formed for example, by a pocket cut to be followed by sanding to provide a smooth surface. As shown and described, the tool is readily converted to a reciprocating jig-saw for forming the pocket cut referred to above. Thereafter, the tool is selectively and quickly adaptable for controlled reciprocating and rotation to perform the finishing operation on the previously cut surface. The use of the shiftable gear train completely housed within the tool results in a multipurpose portable power tool which is of a relatively simple construction and provides an unusually compact and efficiently operable device.

While the invention has been shown and described herein with considerable particularity, it will be understood that the scope thereof is to be determined by the appended claims.

What is claimed is:

1. A portable electric tool comprising a housing having a rotary electric motor therein, a horizontal shoe plate supported upon said housing beneath said motor and adapted to support said tool for movement over a workpiece, said housing including a generally horizontal handle disposed above said motor, switch means associated with said handle for control of said motor, and a power train within said housing and interconnecting said motor and an output shaft, said power train including manually operable selector means for converting the motion of said output shaft from relatively high speed reciprocation through a given stroke length to rotation and relatively low speed reciprocation through said given stroke length without requiring motor speed variation.

2. A portable power tool comprising a housing, a motor in said housing, handle means on said housing, manual control means on said housing for said motor, an output shaft supported on said housing for rotation and reciprocation and adapted to have tool means fixed thereto, a power train interconnecting said motor and said shaft and including manually operable means movable from a first position where said motor rotates said shaft, to a second position where said motor reciprocates said shaft, said train including a gear keyed to said shaft and driven by said motor when said manually operable means is in said first position, and locking means on said housing movable into locking engagement with the teeth of said gear to prevent rotation of said gear and said shaft only when said manually operable means is in said second position.

3. A portable power tool comprising a housing, a motor in said housing, handle means on said housing, manual control means on said housing for said motor, an output shaft supported on said housing for rotation and reciprocation and adapted to have tool means fixed thereto, a power train interconnecting said motor and said shaft and including manually operable means movable from a first position where said motor rotates said shaft, to a second position where said motor reciprocates said shaft, said train including a gear keyed to said shaft and driven by said motor when said manually operable means is in said first position, and locking means on said housing movable into locking engagement with the teeth of said gear to prevent rotation of said gear and said shaft only when said manually operable means is in said second position, said manually operable means being movable to a third position where said motor is out of driving engagement with said gear and said locking means is out of locking engagement with said gear teeth, whereby said shaft may be manually adjusted angularly about its axis.

* * * * *